(12) United States Patent
Wakasa et al.

(10) Patent No.: US 9,836,677 B2
(45) Date of Patent: Dec. 5, 2017

(54) PRINT CONTROLLING APPARATUS AND COMPUTER-READABLE RECORDING MEDIUM STORING PRINT CONTROL PROGRAM

(71) Applicant: SEIKO EPSON CORPORATION, Tokyo (JP)

(72) Inventors: Tetsuya Wakasa, Hokkaido (JP); Hiroyasu Ogata, Hokkaido (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/980,080

(22) Filed: Dec. 28, 2015

(65) Prior Publication Data

US 2016/0275388 A1 Sep. 22, 2016

(30) Foreign Application Priority Data

Mar. 20, 2015 (JP) ................................ 2015-058010

(51) Int. Cl.
 *G06K 15/00* (2006.01)
 *G06K 15/12* (2006.01)
 *G06F 3/12* (2006.01)

(52) U.S. Cl.
 CPC ......... *G06K 15/4045* (2013.01); *G06F 3/121* (2013.01); *G06F 3/1236* (2013.01); *G06F 3/1285* (2013.01); *G06K 15/12* (2013.01)

(58) Field of Classification Search
 CPC ................................................ G06K 15/4045
 USPC ...................................................... 358/1.15
 See application file for complete search history.

(56) References Cited

U.S. PATENT DOCUMENTS

| 2009/0174913 A1* | 7/2009 | Ikeda | H04N 1/506 358/474 |
| 2013/0067120 A1* | 3/2013 | Forrest, III | G06F 13/387 710/19 |
| 2015/0070719 A1* | 3/2015 | Kuribara | G06F 3/1203 358/1.13 |
| 2016/0274845 A1* | 9/2016 | Wakasa | G06F 3/1254 |

OTHER PUBLICATIONS

V4 Printer Driver (Windows Drivers) from http://msdn.microsoft.com/library/windows/hardware/br259124.

* cited by examiner

*Primary Examiner* — Jacky X Zheng
(74) *Attorney, Agent, or Firm* — Global IP Counselors, LLP

(57) ABSTRACT

A print controller includes a communication section configured to communicate with a printer, a communication controlling section configured to request transmission of a transmission command for acquiring response data to the printer, and a printing data processing section configured to process printing data on a host-based system and transmit the processed printing data to the printer via the communication section. During communication on the host-based system, the printing data processing section transmits the transmission command to the printer via the communication section and acquires the response data returned from the printer in response to the transmission command. The communication controlling section processes the acquired response data as response data corresponding to the transmission command.

6 Claims, 6 Drawing Sheets

TRANSMISSION DATA STRUCTURE

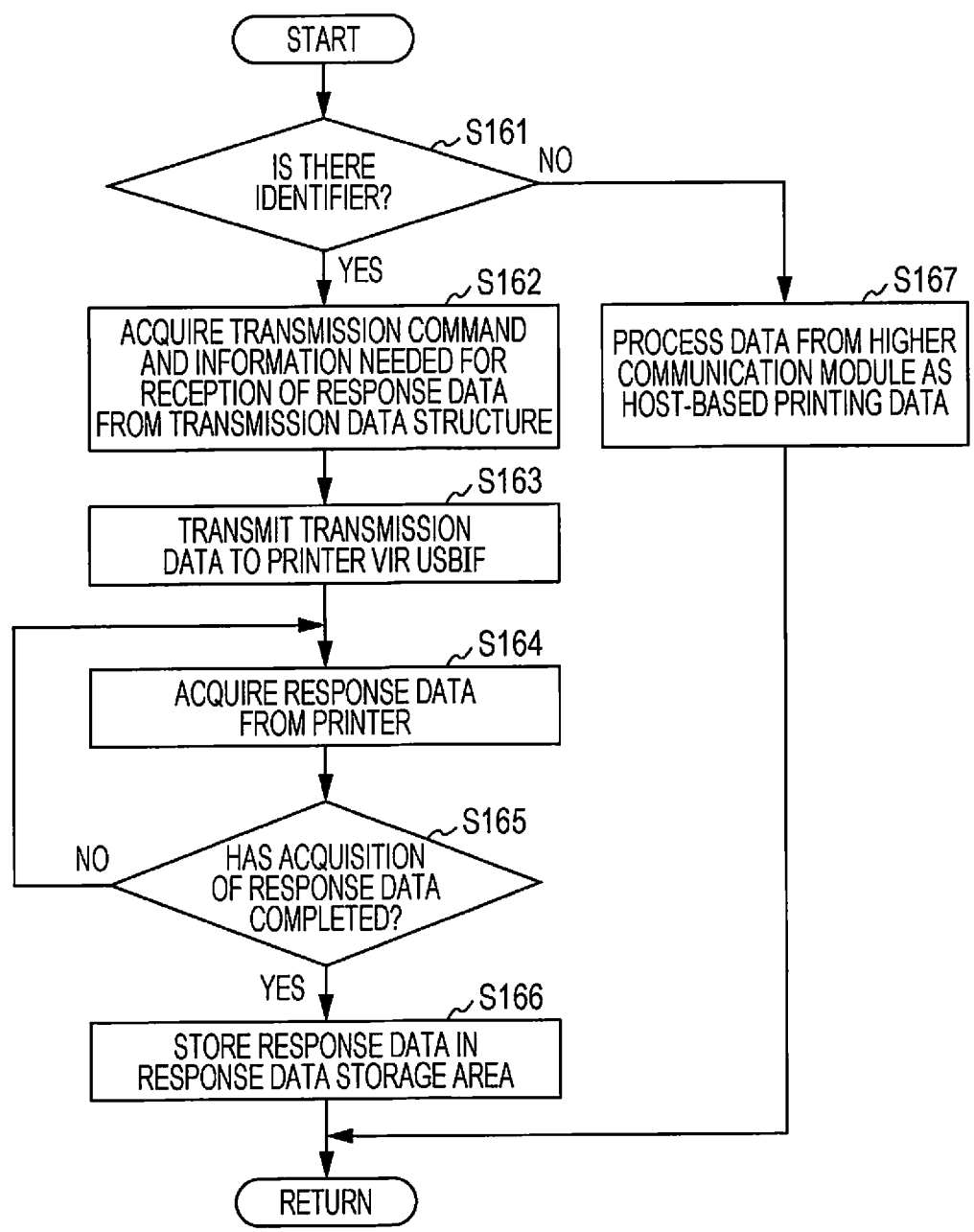

PRINT CONTROLLING APPARATUS AND COMPUTER-READABLE RECORDING MEDIUM STORING PRINT CONTROL PROGRAM

CROSS REFERENCES TO RELATED APPLICATIONS

This application claims priority to Japanese Application No. 2015-058010, filed Mar. 20, 2015, the entirety of which is incorporated by reference herein.

BACKGROUND

1. Technical Field

The present invention relates to print controllers for bidirectionally communicating with printers.

2. Related Art

A terminal running under Windows (Registered Trademark) has a bidirectional (BiDi) communication function for bidirectionally communicating with a device such as a printer. The use of the bidirectional communication function allows the terminal to transmit a command to the printer and to acquire response data corresponding to the transmitted command from the printer.

In a Version 4 printer driver (hereinafter also referred to as a V4 printer driver) running under Windows 8 and subsequent versions, the bidirectional communication function is defined as an extended function for device control. According to the extended function, the process of transmitting a command from an application to a printer and the process of acquiring response data from the printer are realized by separate interfaces written in JavaScript (Registered Trademark). For example, in order to transmit the command issued by the application to the printer, a series of processes is performed by using a set method of the extended function. On the other hand, to acquire the response data from the printer, a series of processes is performed by using a get method of the extended function.

An example of the related art is found at http://msdn.microsoft.com/library/windows/hardware/br259124.

According to the bidirectional communication function of the V4 printer driver, the processes performed by using the set method are not synchronized with the processes performed by using the get method. Therefore, there is a case where a command transmitted by using the set method does not correspond to data acquired by using the get method.

SUMMARY

An advantage of some aspects of the invention is to provide a print controller and a print control program capable of properly reducing the variance between the transmission of a transmission command to a printer and the acquisition of response data from the printer.

An aspect of the invention to provide the above-referenced advantage is directed to a print controller that controls a printer by using a communication section. The "terminal" may be any device, for example, a personal computer, a tablet terminal, a smartphone, or the like as long as the device includes a V4 printer driver and is thus capable of controlling the printer. The "communication section" is an interface realizing communication between the printer and the print controller and operates according to Universal Serial Bus (USB), a Transmission Control Protocol/Internet Protocol (TCP/IP), and a known infrared communication protocol.

A communication controlling section makes a transmission request for transmitting a transmission command generated in a printing control section to the printer. The transmission command, with which the communication controlling section makes the transmission request, includes a command generated by an application implemented in the printing control section and a command generated by the communication controlling section.

A printing data processing section performs a host-based printing process. In the host-based printing process, the printing data processing section processes or edits printing data, and transmits the processed or edited printing data to the printer. Moreover, during the host-based printing process, the printing data processing section transmits the transmission command to the printer and acquires response data returned from the printer in response to the transmission command. The communication controlling section processes the response data acquired by the printing data processing section as response data corresponding to the transmission command.

According to the aspect described above, the transmission of the transmission command and the acquisition of the response data are performed in the course of the host-based printing process performed by the printing data processing section. The host-based printing process is completed by performing a series of processes, i.e., starting printing, processing the printing data, and ending the printing. During the series of processes, interruption by, for example, other applications is inhibited. Therefore, processes from the transmission of the transmission command to the acquisition of the response data can be performed as a series of processes.

BRIEF DESCRIPTION OF THE DRAWINGS

The invention will be described with reference to the accompanying drawings, wherein like numbers reference like elements.

FIG. 7 is a flowchart illustrating processes performed by a printing data processing section at step S16.

DESCRIPTION OF EXEMPLARY EMBODIMENTS

Embodiments of the invention will be described below according to the following order.
1. First Embodiment
(1) Configuration of Print Controller
(2) Configuration of Software Functions
(3) Method for Controlling Printing
(4) Operation and Advantages
2. Other Embodiments

1. First Embodiment (1) Configuration of Print Controller

Figure 1:
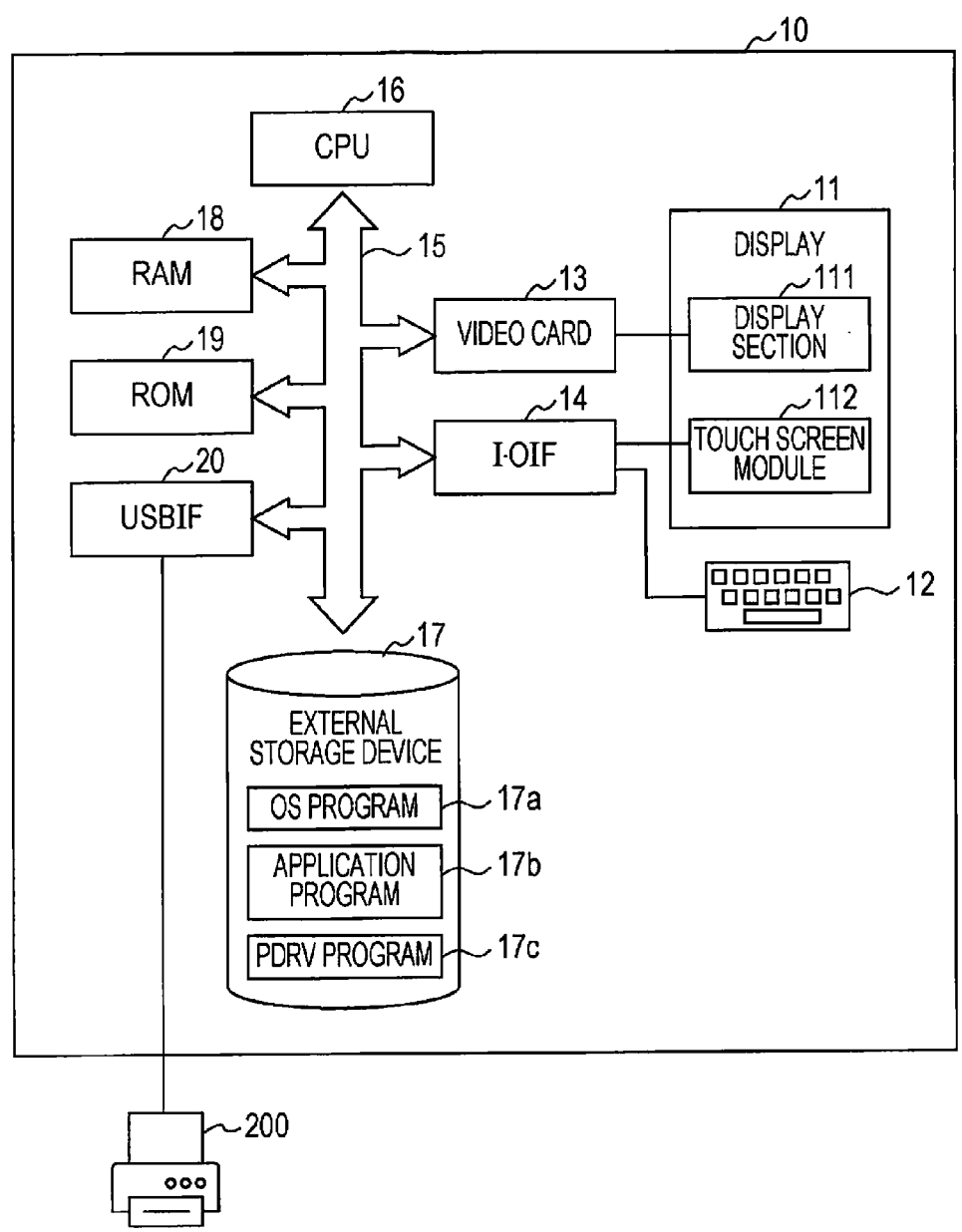
FIG. 1 is a block diagram illustrating the configuration of an example print controller.

FIG. 1 is a block diagram illustrating the configuration of an example print controller. A terminal 10 of a personal computer or the like will be described below as an example of the print controller. The terminal 10 includes a display 11, an operation key 12, a video card 13, an I•OIF 14, a bus 15, a CPU 16, an external storage device 17, a RAM 18, a ROM 19, and a USBIF 20.

The display 11 includes a display section 111 for displaying an image and a touch screen module 112 for receiving an operation of a user. The display section 111 includes, for example, a liquid crystal display (LCD) and a driver circuit for driving the LCD and is connected to the video card 13. The video card 13 connects the bus 15 to the display 11. The touch screen module 112 includes an electrostatic capacitance-type sensor or a resistive film-type sensor and outputs to the I•OIF 14 a voltage value corresponding to the position of the operation performed by the user.

The operation key 12 includes push buttons and is a user interface for receiving an operation of a user.

The I•OIF 14 outputs to the bus 15 a signal generated in response to the operation of the user via the touch screen module 112 or via the operation key 12.

The bus 15 is connected to the CPU 16, the external storage device 17, the I•OIF 14, the RAM 18, the ROM 19, the video card 13, and the USBIF 20. The bus 15 includes a chipset (not shown) and controls communication between the CPU 16 and the other devices.

The CPU 16 loads to the RAM 18 a program stored in the external storage device 17 or the ROM 19 and executes the program, thereby integrally controlling the drive of the terminal 10. The ROM 19 stores a BIOS program which is executed when the CPU 16 is started. The RAM 18 serves as a work area in which programs and data to be processed by the CPU 16 are expanded.

The external storage device 17 stores an operation system (OS) program 17a for imparting a function as an operation system (OS) to the CPU 16, an application program 17b for imparting functions of applications to the CPU 16, and a printer driver program (PDRV program) 17c for controlling a printer 200 in cooperation with the OS. The OS program 17a is, for example, Windows 10 (Windows is a registered trademark). The application program 17b allows the CPU 16 to realize functions of applications including drawing software, PDF file viewers, browsers, and web applications. The PDRV program 17c is a V4 printer driver and has an extended function.

The USBIF 20 includes a USB controller and a USB cable and connects the bus 15 to the printer 200. In this embodiment, a communication section is implemented by the USBIF 20.

The printer 200 is an ink jet printer or a laser printer. The printer 200 is compatible with the PDRV program 17c stored in the external storage device 17. The drive of the printer 200 is controlled in accordance with printing data and a transmission command SC transmitted from the terminal 10 via the USBIF 20. The internal configuration of the printer 200 is known, and the description thereof is thus omitted.

(2) Configuration of Software Functions

Figure 2:
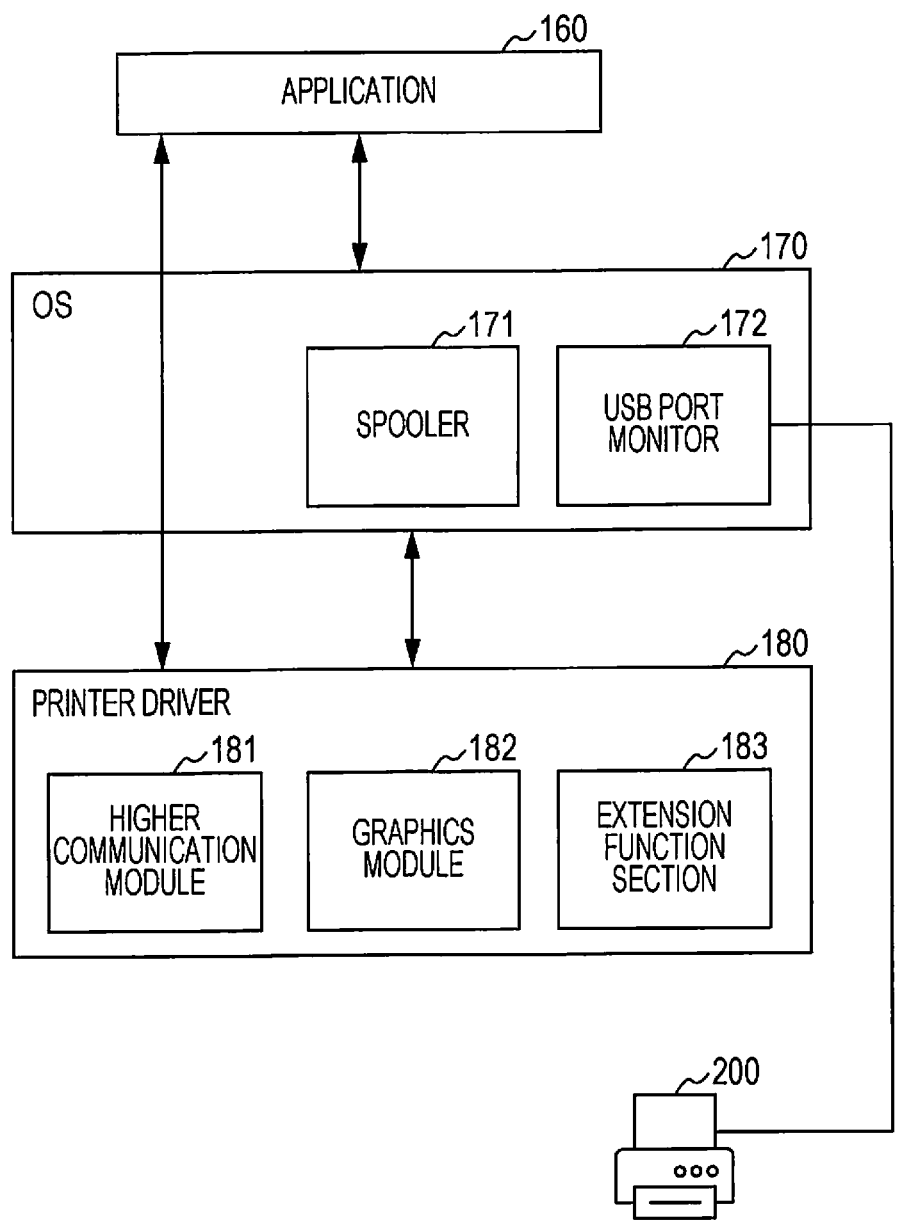
FIG. 2 is a diagram illustrating software functions realized by a CPU.

FIG. 2 is a diagram illustrating software functions realized by the CPU 16. In FIG. 2, the functions which the CPU 16 realizes by the programs stored in the external storage device 17 are illustrated as an application 160, an OS 170, and a printer driver 180.

The application 160 generates printing data including images and sentences. The printing data is assumed to be compatible with an XML paper specification (XPS) format, but the printing data may be compatible with formats other than the XPS format. The application 160 has a function of issuing a maintenance command to the printer 200. The maintenance command is a command that allows the printer 200 to execute processes including the acquisition of status information indicating a remaining ink level, cleaning, and the like. The command issued by the application 160 is hereinafter referred to as a transmission command SC.

The OS 170 includes a spooler 171 and a USB port monitor 172 and controls the printer 200 in cooperation with the printer driver 180. The spooler 171 controls the output process of data (spool data) during a printing process and the transmission and reception of data in response to a request from the printer driver 180. The USB port monitor 172 monitors the port number used when the application 160 performs communication, and the USB port monitor 172 performs actual communication using the port number during the printing process and bidirectional communication.

The printer driver 180 includes an higher communication module 181, a graphics module 182, and an extension function section 183. The higher communication module (communication controlling section) 181 receives the printing data from the application 160 and performs receiving and sending of control data (transmission command SC, response data RD) between the higher communication module 181 and the application 160. During the printing process, the graphics module 182 converts the printing data generated by the application 160 into data of a format with which the printer 200 is compatible. The extension function section 183 includes modules for extending functions executed during the printing process and the bidirectional communication.

The extension function section 183 includes a plurality of functional modules for each function thereof. Each functional module includes a script file written in JavaScript and an Extensible Markup Language (XML) file. The XML file serves as a schema defining each function, and the script file operates based on the XML file, thereby providing an extended function to the printer driver 180. Each functional module is called by the spooler 171, thereby being executed.

Figure 3:
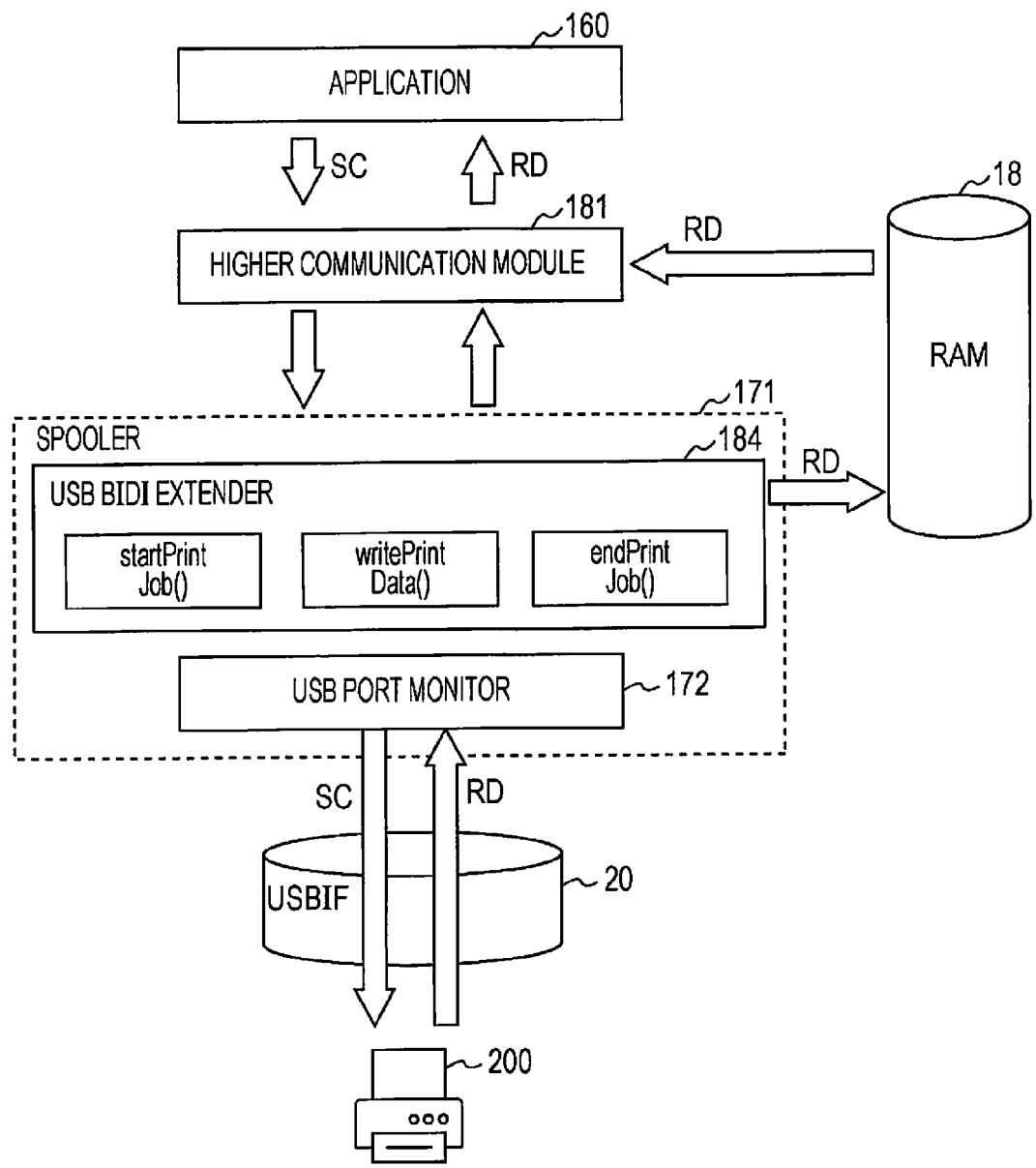
FIG. 3 is a diagram schematically illustrating only a host-based system-related function among functions that a terminal executes by using an extension function section.

FIG. 3 is a diagram schematically illustrating only host-based system-related functions among functions that the terminal 10 executes by using the extension function section 183. In FIG. 3, a USB Bidi extender 184 of the extension function section 183 is illustrated. The USB Bidi extender 184 extends the function of USB communication of the terminal 10.

The host-based printing processing is the function of processing pages or editing the output order of the pages, and the like for spool data output from the spooler 171 via the USBIF 20. This function is provided to Windows 8.1 and subsequent versions. As functions for realizing the host-based printing process, the USB Bidi extender 184 has a method (function) startPrintJob( ) of executing a process relating to setting an initial value necessary for printing, a method (function) writePrintData( ) of processing the spool data and executing the process of transmitting the spool data to the printer 200, and a method (function) endPrintJob( ) of executing processes after the printing has ended.

The methods of the USB Bidi extender 184 are read by the spooler 171 in the following order: startPrintJob( ) writePrintData( ) and endPrintJob( ) so as to execute a series of the host-based printing processes. The spooler 171 does not accept other processes due to exclusive control while the series of processes (startPrintJob( ) writePrintData( ) and endPrintJob( ) is executed. The function which the terminal 10 (CPU 16) realizes by the functions startPrintJob( ) writePrintData( ) and endPrintJob( ) of the USB Bidi extender 184 is hereinafter also referred to as a printing data processing section 185.

(3) Method for Controlling Printing

Figure 4:
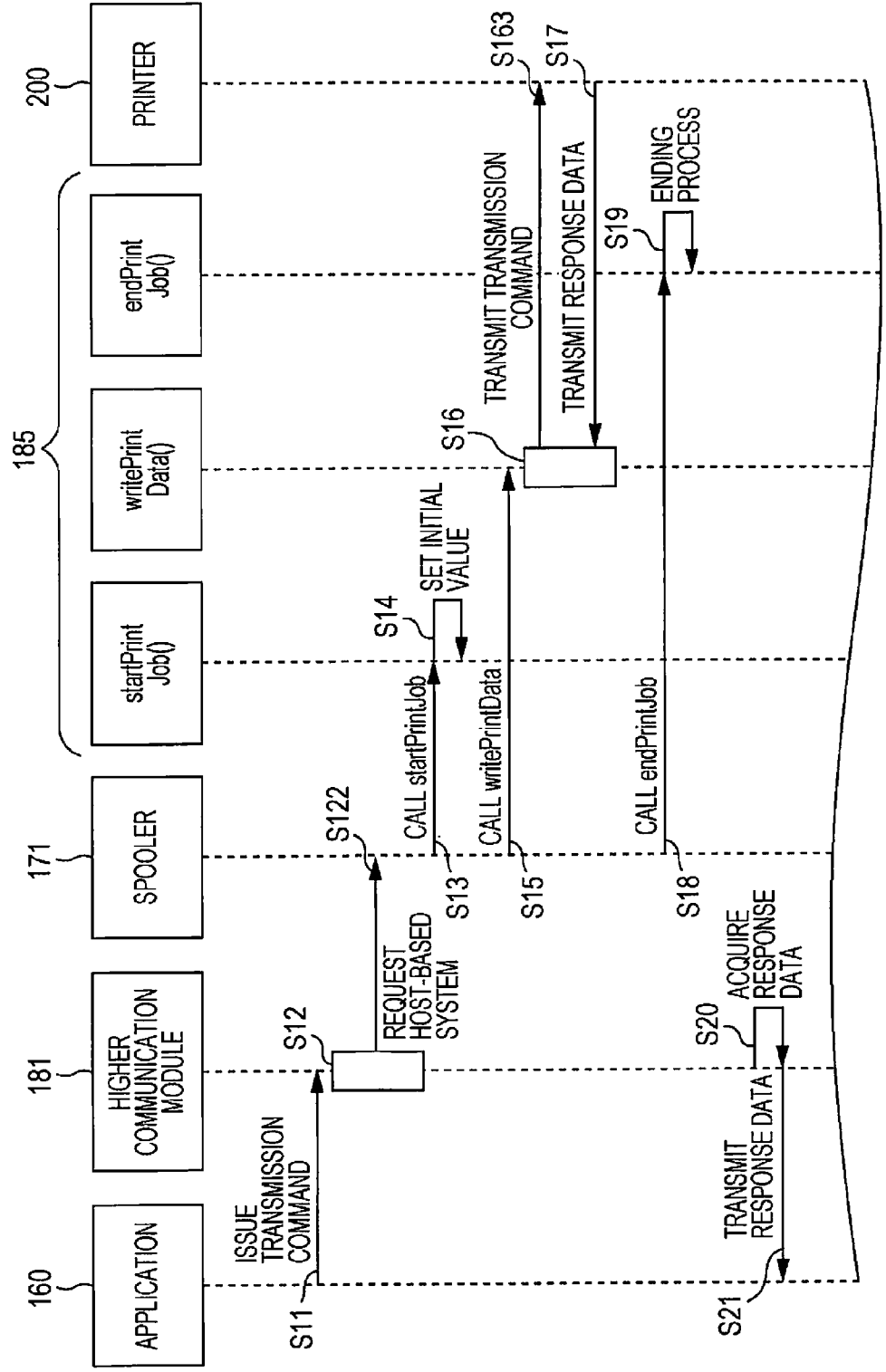
FIG. 4 is a sequence diagram illustrating processes relating to the transmission of a transmission command.

Next, a method for controlling printing by using the extended function will be described. FIG. 4 is a sequence diagram illustrating processes relating to the transmission of the transmission command SC. FIG. 4 illustrates the processes performed by the application 160, the higher communication module 181, the spooler 171, the printing data processing section 185, and the printer 200.

At step S11, the application 160 issues the transmission command SC to request the printer 200 for status information (the response data RD). For example, the status information is information allowing the application 160 to display a UI screen indicating the status of the printer 200.

Figure 5:
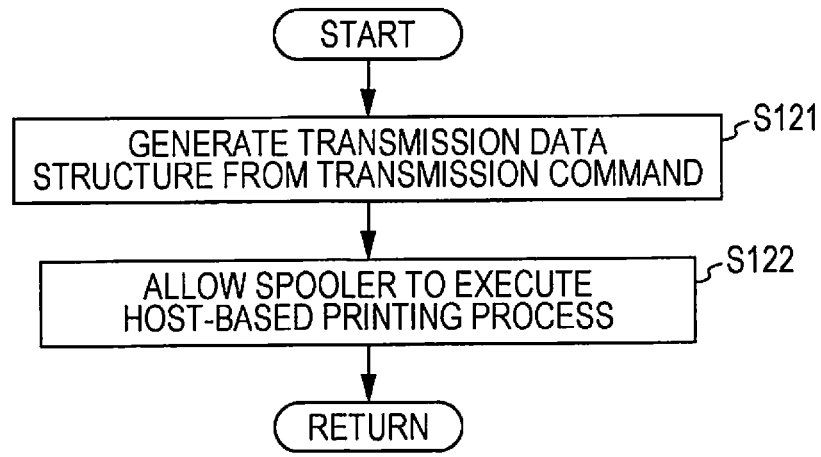
FIG. 5 is a flowchart illustrating processes performed by a higher communication module at step S12.

At step S12, the higher communication module 181 performs a process to transmit the transmission command SC to the printer 200. FIG. 5 is a flowchart illustrating processes performed by the higher communication module 181 at step S12.

At step S121, the higher communication module 181 generates a transmission data structure from the transmission command SC. The transmission data structure is structure data including the transmission command SC and auxiliary information. The transmission command included in the transmission data structure is similar to the transmission command SC issued by the application 160. The auxiliary information includes an identifier indicating whether or not the transmission data structure is printing data and reference information to which the printing data processing section 185 refers when communication using the transmission command SC and the response data RD is performed.

The transmission command included in the transmission data structure is hereinafter denoted by a different reference number (310 in FIG. 6) so as to be distinguished from the transmission command SC issued by the application 160.

Figure 6:
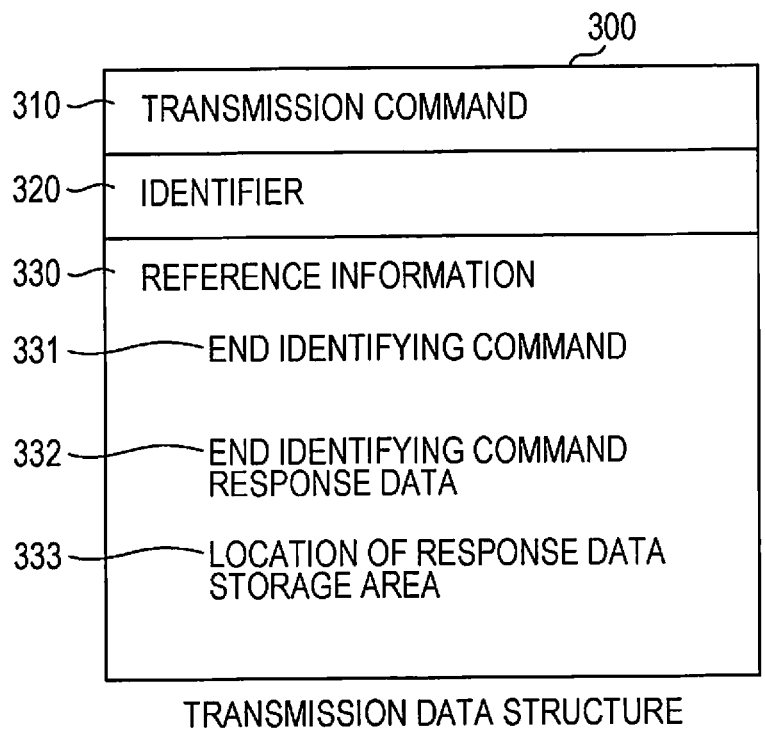
FIG. 6 is a diagram illustrating an example transmission data structure.

FIG. 6 is a diagram illustrating a transmission data structure 300 as an example. In FIG. 6, the transmission data structure 300 includes the transmission command 310, an identifier 320, and reference information 330. The reference information 330 includes an end identifying command 331, end identifying command response data RD332, and a location 333 of a schema for storing the response data RD. The end identifying command 331 indicates a command based on which the printing data processing section 185 determines the end of the response data RD from the printer 200. The end identifying command response data RD332 indicates data that the printing data processing section 185 acquires from the printer 200 in response to the transmission of the end identifying command 331. When the printing data processing section 185 transmits the transmission command SC and thereafter the end identifying command 331 to the printer 200 via the USBIF 20, the printer 200 returns the response data RD and thereafter the end identifying command response data RD332 in the case where returning of the response data RD has ended. The location 333 of the schema for storing the response data RD indicates the location of an area in which the response data RD acquired from the printer 200 is to be stored (response data storage area). The location of the response data storage area is an area defined by the XML file of the extension function section 183.

At step S122, the higher communication module 181 requests that the spooler 171 processes the transmission data structure 300 on the host-based system. In response to the request from the higher communication module 181, the spooler 171 sequentially calls the functions StartPrintJob( ) writePrintData( ) and endPrintJob( ) from the USB Bidi extender 184 in order to process the transmission data structure 300 (steps S13, S15, and S18).

First, at step S13, the spooler 171 calls the function startPrintJob( ). The called function startPrintJob( ) allows the CPU 16 (printing data processing section 185) to set an initial value necessary for the host-based system (step S14).

At step S15, the spooler 171 calls the function writePrintData( ). In this embodiment, the called function writePrintData( ) allows the transmission of the transmission command SC to the printer 200 and the acquisition of the response data RD from the printer 200 (step S16) to be performed.

FIG. 7 is a flowchart illustrating processes performed by the printing data processing section 185 at step S16.

At step S161, the printing data processing section 185 determines whether or not the identifier 320 is included in the transmission data structure 300.

If the identifier 320 is included in the transmission data structure 300 (YES at step S161), the printing data processing section 185 acquires the transmission command 310 and the reference information 330 from the transmission data structure 300 at step S162.

At step S163, the printing data processing section 185 transmits the transmission command SC obtained from the transmission data structure 300 to the printer 200 via the USBIF 20. The printing data processing section 185 controls the USB port monitor 172 and transmits a transmission command SC310 to the printer 200. When the printer 200 receives the transmission command SC310 via the USBIF 20, the printer 200 interprets the transmission command SC and generates the response data RD corresponding to the transmission command SC.

At step S164, the printing data processing section 185 acquires the response data RD from the printer 200. The printer 200 transmits the response data RD to the terminal 10 via the USBIF 20 (step S17 in FIG. 4), and the printing data processing section 185 acquires the response data RD.

If the acquisition of the response data RD from the printer 200 has not been completed (NO at step S165), the printing data processing section 185 continues acquiring the response data RD (step S164). Completion of the acquisition of the response data RD is determined by transmitting an "end identifying command 331" obtained from the transmission data structure 300 by the printing data processing section 185 to the printer 200 via the USBIF 20. If the end identifying command response data RD332 is not returned from the printer 200 in response to the end identifying command 331, the printing data processing section 185 determines that the acquisition of the response data RD from the printer 200 has not ended. On the other hand, if the end identifying command response data RD332 is returned from the printer 200 in response to the end identifying command 331, the printing data processing section 185 determines that the acquisition of the response data RD from the printer 200 has been completed.

If the acquisition of the response data RD has been completed (YES at step S165), the printing data processing section 185 stores the response data RD in the response data storage area of the RAM 18 at step S166. The location of the response data storage area is determined based on a reference destination indicated by the location 333 of the response data storage area obtained from the transmission data structure 300.

If at step S161, the printing data processing section 185 determines that the identifier is not included in the transmission data structure 300 (NO at step S161), the printing data processing section 185 determines data received from the higher communication module 181 to be normal printing data at step S167, and host-based printing will be performed.

Referring back to FIG. 4, the spooler 171 calls the function endPrintJob( ) at step S18. The function endPrintJob( ) allows the CPU 16 (printing data processing section 185) to end the host-based printing process (step S19).

When the processes by the spooler 171 have ended, the higher communication module 181 acquires at step S20 the response data RD from the response data storage area specified by the transmission data structure 300.

At step S21, the higher communication module 181 sends the acquired response data RD to the application 160. For example, the application 160 displays a UI screen in which the status of the printer 200 is displayed based on the response data RD acquired from the higher communication module 181.

(4) Operation and Advantages

As described above, in the first embodiment, the host-based printing process by the extension function section 183 is also used to synchronize the transmission command SC with the response data RD. In the host-based printing process, interruption by, for example, other applications is inhibited before the series of functions startPrintJob( ) writePrintData( ) and endPrintJob( ) has been executed. Therefore, processes from the transmission of the transmission command SC to the acquisition of the response data RD can be performed as a series of processes.

The function by the printing data processing section 185 is called by the spooler 171 and is then executed. Therefore, even when the application 160 issues transmission commands SC in succession, the spooler 171 starts transmitting a next transmission command SC and acquiring next response data RD after the acquisition of response data RD corresponding to a preceding transmission command SC has ended (i.e., endPrintJob( ) has ended). As a result, the series of processes including the transmission of the transmission command SC and the acquisition of the response data RD is continuously performed, so that interruption of the response data RD can be reduced.

The higher communication module 181 specifies an area in which the response data RD is to be stored, so that the processing load necessary for acquiring the response data RD can be reduced.

2. Other Embodiments

The higher communication module 181 may be any module as long as the module uses a specific area in the printing data to request the spooler 171 to perform processes. The specific area may be, for example, a comment field included in the printing data, and the transmission command SC and the reference information may be written in the comment field to request the spooler 171 to perform the processes. The spooler 171 can refer to the comment field included in the printing data to determine that the printing data is the transmission command SC.

The invention is not limited to the above-described embodiments. It will be appreciated by those skilled in the art that the following are an embodiment of the invention.

The mutually replaceable members, configuration, and the like disclosed in the above-described embodiments can be applied through an appropriate change in the combination thereof.

Although not disclosed in the above-described embodiments, members, configuration, and the like in the related art mutually replaceable with the members, configuration, and the like disclosed in the above-described embodiments can be applied through an appropriate replacement or a change in the combination thereof.

Although not disclosed in the above-described embodiments, members, configuration, and the like that are assumed by those skilled in the art based on the related art to be replacements for the members, configuration, and the like disclosed in the above-described embodiments can be applied through an appropriate replacement or a change in the combination thereof.

What is claimed is:

1. A print controlling apparatus for controlling a printer, the print controlling apparatus comprising:
   a communication interface configured to communicate with the printer; and
   a processor constituting
      a communication controlling section configured to request transmission of a transmission command for acquiring response data to the printer, and
      a printing data processing section configured to process printing data on a host-based system and transmit the processed printing data to the printer via the communication interface, wherein
   the printing data processing section, during communication on the host-based system, transmits the transmission command to the printer via the communication interface and acquires the response data returned from the printer in response to the transmission command,
   the communication controlling section processes the acquired response data as response data corresponding to the transmission command,
   the communication controlling section specifies a storage location of the response data to the printing data processing section,
   the printing data processing section receives the response data from the printer and stores the response data in the specified storage location,
   the communication controlling section acquires the response data from the specified storage location, and
   the printing data processing section performs control so that the printing data processing section abstains from performing other communication processes due to exclusive control during the communication on the host-based system including the transmission of the transmission command from the printing data processing section to the printer and the acquisition of the response data returned from the printer to the printing data processing section.

2. The print controlling apparatus according to claim 1, further comprising:
   a spooler configured to control an output order of a plurality of pieces of printing data, wherein
   the spooler calls the printing data processing section in response to a request from the communication controlling section.

3. The print controlling apparatus according to claim 1, wherein
   the printing data processing section is realized by a series of methods, which are a method startPrintJob of starting printing, a method writePrintData of processing and transmitting printing data, and a method endPrintJob of ending the printing, and
   transmission of the transmission command and acquisition of the response data are performed by the method writePrintData in processes performed by the series of methods.

4. The print controlling apparatus according to claim 1, wherein
the communication interface is an interface compatible with a USB standard.

5. The print controlling apparatus according to claim 1, wherein
the communication controlling section uses a specific area of the printing data to specify the transmission command to the printing data processing section.

6. A non-transitory computer-readable recording medium storing a print control program for allowing a computer to control a printer, allowing the computer to realize
a communication controlling function of requesting transmission of a transmission command for acquiring response data to the printer; and
a printing data processing function of processing printing data on a host-based system and transmitting the processed printing data to the printer via a communication interface, wherein
the printing data processing function, during communication on the host-based system, allows transmission of the transmission command to the printer via the communication interface and acquisition of the response data returned from the printer in response to the transmission command,
the communication controlling function processes the acquired response data as response data corresponding to the transmission command,
the communication controlling function specifies a storage location of the response data,
the printing data processing function receives the response data from the printer and stores the response data in the specified storage location,
the communication controlling function acquires the response data from the specified storage location, and
the printing data processing function performs control so that the printing data processing function abstains from performing other communication processes due to exclusive control during the communication on the host-based system including the transmission of the transmission command to the printer and the acquisition of the response data returned from the printer.

\* \* \* \* \*